United States Patent [19]
Harris et al.

[11] Patent Number: 5,361,726
[45] Date of Patent: Nov. 8, 1994

[54] ANIMAL LEASH

[76] Inventors: James A. Harris, 300 E. 16th St., No. 309, Greeley, Colo. 80631; Nancy J. Harris, 3550 S. Harlan No. 231, Denver, Colo. 80235

[21] Appl. No.: 90,284

[22] Filed: Jul. 12, 1993

[51] Int. Cl.⁵ .............................................. A01K 27/00
[52] U.S. Cl. .................................... 119/797; 54/34; 24/115 R
[58] Field of Search .............. 119/795, 769, 770, 797; 54/64, 34, 69; 24/115 R, 132 R, 302

[56] References Cited

U.S. PATENT DOCUMENTS 2,821,168  1/1958  Forbes .................... 119/795
4,745,883  5/1988  Baggetta .................. 119/770

Primary Examiner—Gene Mancene
Assistant Examiner—Todd E. Manahan

[57] ABSTRACT

A simple, strong, and durable animal leash is disclosed, comprising two elements. The first element is a lead of woven nylon, with a loop formed in each end, the two loops being equal in size and appropriate for grasping by a person's hand. The second element is a carabiner, which is a relatively large link made of aluminum, one side of which is a gate which can pivot inward so as to open the carabiner and permit its attachment to one or both of the loops and a collar, halter, or harness, thereby providing for simple and convenient attachment of the leash to the animal in a multiplicity of ways.

6 Claims, 2 Drawing Sheets

ANIMAL LEASH

BACKGROUND OF THE INVENTION

1. Field of the Invention

This invention is in the field of animal leashes and leads.

2. Discussion of the Background

Animal leashes have heretofore been constructed of a strap of flexible material such as leather, cotton, or nylon, to which is permanently attached a connection device made of metal or some other rigid material to use in attaching the leash to the collar or halter of an animal. The connection device is commonly a metal construction which comprises a ring (not necessarily circular) by which the device is permanently attached to the strap, and a snap hook which can be attached to another metal ring which is part of the collar or halter. Illustrations of this prior art may be found in U.S. Pat. Nos. 950,470 (Bellamy), 2,827,017 (Ryan), 3,332,398 (Mintz), 4,763,609 (Kulik), and 5,161,486 (Brown). This list of patents spans the period from the turn of the century to the present. An examination of leashes now commercially available reveals that the same basic design for connection means has been used consistently for many years.

The connection means used in animal leashes heretofore suffers from several limitations. The first limitation is that the inner space circumscribed by the metal snap hook is small. The snap hook is intended for attachment to a metal ring on the animal's collar or halter, and cannot accommodate larger-sized material such as the leash strap itself or the strap of the collar or halter. The second limitation is that the metal connection device is permanently attached to a loop formed in the flexible strap of the leash. This permanent attachment can be disadvantageous if the strap is to be cleaned or laundered, and it can be a disadvantage if the metal device breaks. The third limitation is that these small metal devices are prone to breakage. The fourth limitation is that the snap hook can be awkward to manipulate, particularly in trying to attach it to the metal ring on the collar or halter of a restless animal. This shortcoming is particularly troublesome to a person with a physical limitation such as poor eyesight or arthritis.

The leash disclosed herein overcomes these disadvantages by simplifying the design of the leash, and using an extremely strong and durable aluminum carabiner as a connection means instead of the smaller and more fragile metal connection device of the prior art. The carabiner is not permanently attached to the leash, and the advantages of this concept include versatility in configuring the leash, and ease of cleaning the fabric strap of the leash. The large inner area circumscribed by the carabiner, in contrast to the small area of conventional metal snap hooks, produces substantial advantages with respect to ease and flexibility in attaching the leash to the collar or halter of the animal, and in using the leash in different configurations. The nature of the carabiner makes it easier to manipulate than the conventional snap hook devices. These advantages of the present invention are described in more detail in the following sections.

SUMMARY OF THE INVENTION

The leash disclosed herein is a simple construction comprising two elements.

The first element is a lead made of a flat strap of woven nylon or the like, having a loop formed at each end. The two loops are sized equally, appropriate for slipping a person's hand through for convenient grasping. The lead can be any convenient length. A five-foot lead is appropriate for a dog leash. Longer leads may be more desirable for controlling larger animals such as lamas, horses, or cattle.

The second element is a carabiner, which is a device used by climbers for linking a rope to a protection device that has been fixed to a rock face. A carabiner is an oval or D-shaped link made of aluminum in which one side of the link, called the gate, may be pivoted inward about a hinge in order to admit a rope or strap into the carabiner. The hinge is spring-loaded, so that the gate of the carabiner is normally closed. Carabiners are manufactured in various sizes; the carabiner most appropriate for the animal leash disclosed herein is made from aluminum rod formed into an oval having a long outside dimension of about four inches and a short outside dimension of about two inches, with a material diameter of about seven-sixteenths inch. The material of choice in this application is aluminum, which gives the attributes of light weight, strength, and corrosion resistance.

The carabiner in combination with a lead having identical loops at each end makes for an animal leash of extraordinary convenience, versatility, and durability. Either one or both lead loops can be placed into the carabiner, so that the leash can be either long or short. In the long-leash mode, one loop is used by the person for grasping the end of the leash. Since the loops have the same size, and are hence interchangeable, there is no need to concern oneself with which loop is at the grasping end and which loop is at the carabiner end. In the short-leash mode, both lead loops are through the carabiner, and the person grasps the lead at its midpoint. There is additionally an ultra-short mode which may be effected by also placing the midpoint of the lead through the carabiner. The leash disclosed herein is extraordinarily easy to use. The carabiner need not be attached to a metal ring on the animal's collar or halter; rather, it can be very quickly and easily attached around the strap material itself of the collar or halter. This makes attachment to the animal much simpler, particularly if the animal happens to be in an excited or uncooperative mood. A carabiner by its nature is easier to manipulate than the smaller snap hooks used in prior art leashes. It is sized perfectly to fit in the palm of the hand, and opening and closing the device is a very easy and natural motion; this attribute is clearly very important to a climber. The ease of use for the device is an advantage to anyone, but it is particularly advantageous to a person with a physical disability such as arthritis or poor eyesight.

Another attribute of the leash disclosed herein is the ease and convenience with which it can be stowed, hands-free, on the body of a person for periods when it is desired to let the animal run free. The user simply places both lead loops into the carabiner and slings the leash over one shoulder bandolier-style.

It is apparent from the foregoing, therefore, that the relatively large size of the carabiner relative to the metal clips used in prior art leashes is a central attribute of the invention because it permits numerous loops of the lead strap, together with the strap of the collar or halter, to be quickly and easily linked together. Such versatility and ease of use is not possible with prior art leashes.

The nylon lead and aluminum carabiner provide a leash of unparalleled durability. Carabiners are designed to be rugged and strong, since the life of a climber is in jeopardy if the device fails. For all intents and purposes, a carabiner used in the application described herein, namely an animal leash, will never wear out, break, or fail in any way. The nylon strap used in the preferred embodiment of the invention is also an extremely strong and durable material for this purpose.

The fact that the carabiner is not permanently attached to the nylon strap is an advantage. When the strap is soiled or dirty, it can be washed independently of the carabiner. This is a particular advantage if the strap is laundered in an automatic washing machine or dryer, since the metal component will not be present to nick or scratch the washer tub or the dryer drum.

DETAILED DESCRIPTION OF THE PREFERRED EMBODIMENT

Figure 1:
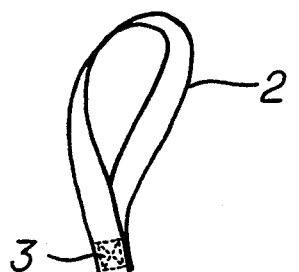
FIG. 1 shows a nylon lead with a hand-hold loop in each end.

FIG. 1 shows a lead 1 with a hand-hold loop 2 in each end. The lead may be formed of a woven tube of nylon which is flattened out to give a strap having a width of about one inch. The loop 2 at each end is formed by folding over approximately twelve inches of strap and placing stitching 3 as shown so as to effect a strong and durable loop.

Figure 2:
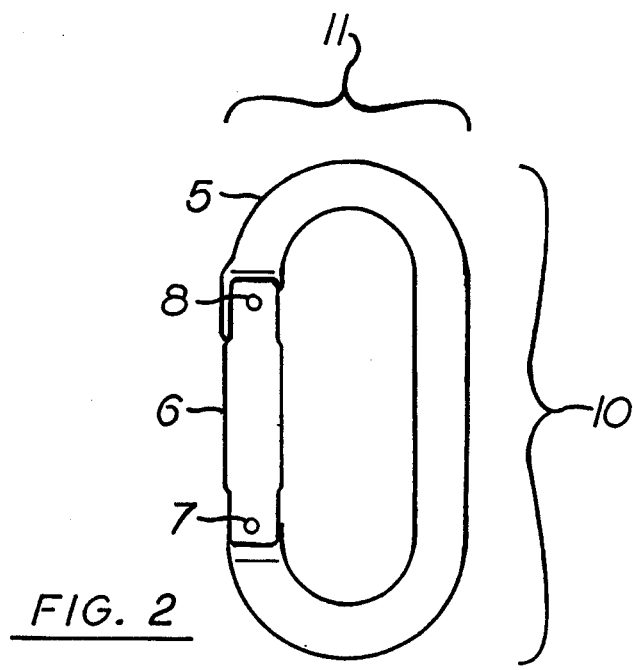
FIG. 2 shows a carabiner in the normally closed configuration.
Figure 3:
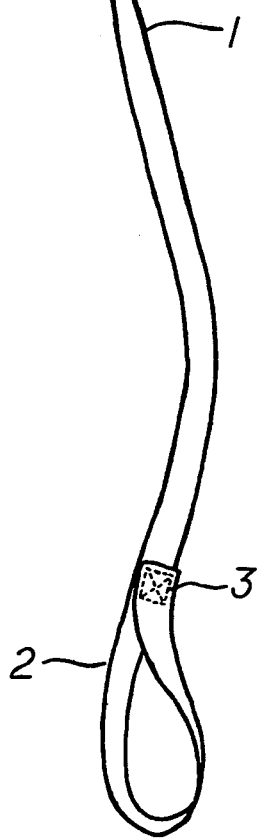
FIG. 3 shows a carabiner being held open to admit a loop, collar, or halter.
Figure 3:
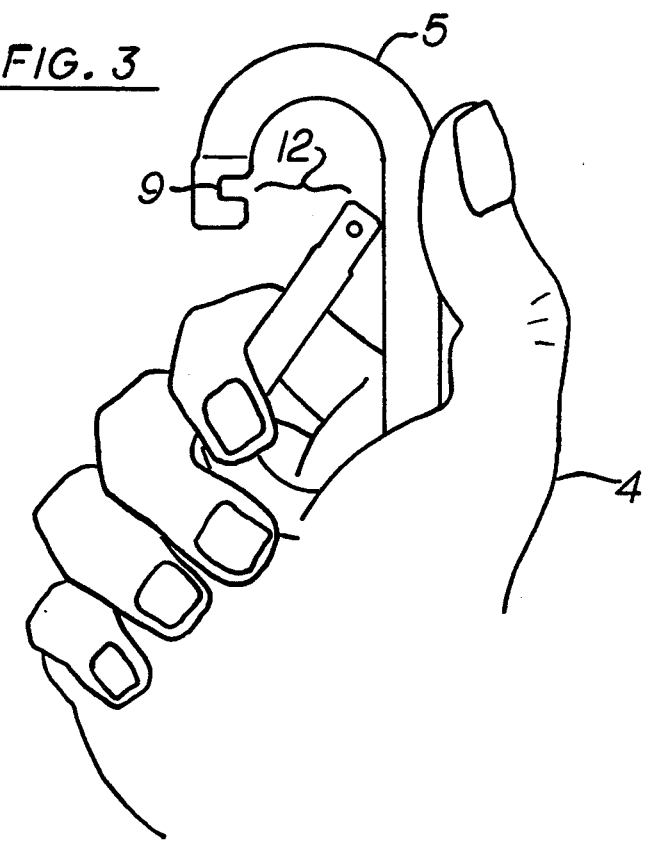

An oval carabiner in its normally closed position is shown in FIG. 2. FIG. 3 shows the carabiner being held open by a person's hand 4. A body 5, made of a single piece of aluminum, forms one side and the two semi-circular ends of the oval. A gate 6 forms the other side of the oval. The gate 6 can pivot inward about a pin hinge 7, thereby opening the carabiner as seen in FIG. 3. The hinge is spring-loaded with a piece of spring steel (not visible in the drawings), so that the gate stays in the closed position unless a force is applied to open it. A second pin 8 is located in notch 9 when the carabiner is closed, giving additional strength to the structure; this design attribute is particularly important in mountaineering use, but it is less important for the use of the carabiner in an animal leash.

Typical dimensions (approximate) for the carabiner used in the leash disclosed herein are length 10: four inches; width 11: two inches. The gate opening 12 is approximately one inch. A carabiner having these dimensions is ideally suited for manipulation in a person's hand; indeed, maximum ease of use has been intentionally designed into these devices, since this is critical in a climbing application. This ease of use is transferred over to the application disclosed herein. The gate opening 12 of approximately one inch contrasts sharply with the much smaller gate opening for snap hooks used in prior art leashes. The snap hooks used in prior art leashes are not only harder for a person to manipulate; but also they are not large enough to admit and enclose the strap material normally used for a dog collar or a large-animal halter. The snap hooks used in prior art leashes are intended for attachment to a metal ring which is normally attached to or part of a collar or halter for this purpose. Making the attachment of the smaller snap hook to a collar or halter ring is a more difficult manipulation than making the attachment of the larger, easier-to-manipulate carabiner around any portion of a collar or halter.

Figure 4:
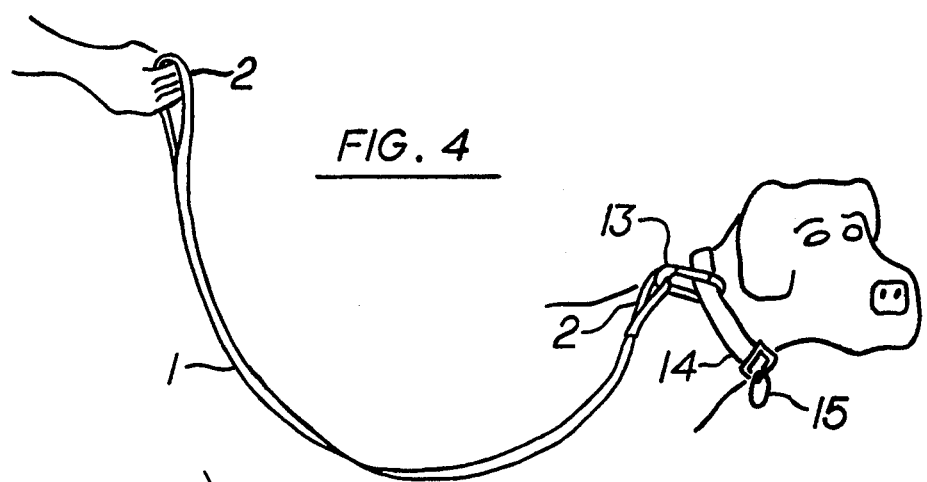
FIG. 4 shows the leash being used in the long mode.

In FIG. 4, the leash is shown in the long mode. The carabiner 13 encloses one loop 2 of the lead 1, and a dog collar 14. Note that a collar ring 15 may be used, but need not be used, for attachment of the leash.

Figure 5:
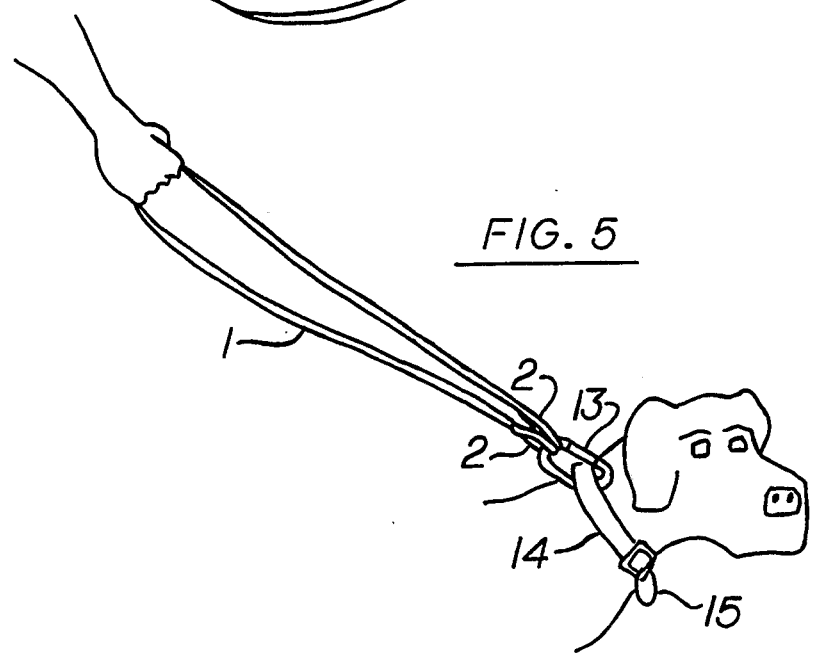
FIG. 5 shows the leash being used in the short mode.

In FIG. 5, the leash is shown in the short mode, in which the carabiner 13 encloses both loops 2 of the lead, and the dog collar 14.

Figure 6:
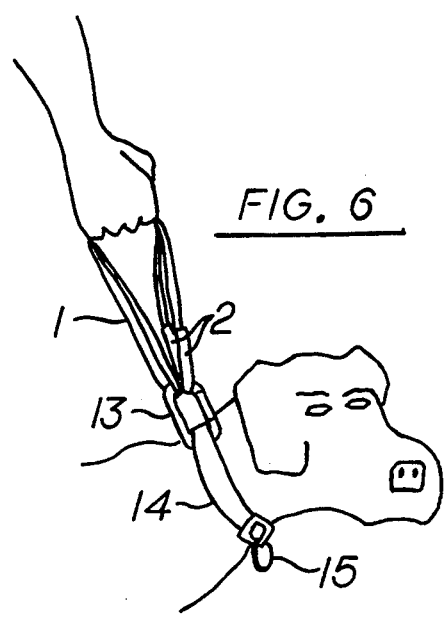
FIG. 6 shows the leash being used in the ultra-short mode.

FIG. 6 shows the leash configured in the ultra-short mode. In addition to the two loops 2, the midpoint of the lead 1 is also looped into the carabiner 13 to reduce the effective leash length to one-fourth of the long-mode length. An unruly animal may be very effectively restrained in this manner.

The use of the carabiner, with its large area inside the link and wide gate opening, allows for maximum simplicity and flexibility in configuring and attaching the leash. This is in marked contrast to prior art leashes, in which a snap hook, permanently attached to one end of the leash, does not have a sufficient loop area and gate opening to allow the configuration and attachment flexibility demonstrated herein. Also, the advantage of being able to detach the carabiner from the strap for purposes of cleaning has already been stated; this feature is not present in prior art leashes.

The use of a woven nylon strap and an oval aluminum carabiner has been described as the preferred embodiment of the invention disclosed herein. The substitution of other similar components could be made without departing from the scope and teachings of this disclosure. For example, a material different from woven nylon could be used for the lead; for example, cotton or leather could be used as the lead material. Also, the loops in the ends of the lead could be formed by some means other than stitching, such as knotting or braiding the material. The carabiner could be made of steel, or some other metal, or even an engineering plastic, rather than aluminum, although aluminum is preferred for the reasons previously stated. Also, a D-shaped carabiner could be substituted for the oval-shaped carabiner described herein.

What is claimed is:

1. An animal leash, comprising:

a lead of flexible material having a loop formed in each end, said loops being substantially equal in size, said size being appropriate for the comfortable placement of a person's hand through the loop for grasping; and a carabiner having two straight sides and two curved ends, thereby forming a link, and made of a suitably strong and rigid material, said carabiner comprising a body which forms one of said straight sides and the two said curved ends of the carabiner; and a gate which forms the other of said straight sides, said gate being attached to the body by a spring-loaded hinge, whereby the gate is normally held in a closed position such that the carabiner forms a closed link, and further whereby the gate may be opened by hand by pivotting it into the inner portion of the carabiner link, so that one or both of said lead loops, may be admitted into the carabiner, further wherein said carabiner is of a size sufficient to easily admit and enclose said lead loops;

whereby said carabiner may be used to link said lead to a collar or halter or harness in a multiplicity of ways, thereby giving a person a means of quickly and easily attaching the leash to an animal wearing the collar or halter or harness.

2. The leash of claim 1 wherein said carabiner is oval in shape.

3. The leash of claim 1 wherein said carabiner is made of aluminum.

4. The leash of claim 1 wherein said carabiner is an oval having length between three and five inches, width between one and one-half and three inches, and material cross-section dimension between one-quarter and one-half inch.

5. The leash of claim 1 wherein said carabiner is D-shaped, having length between three and five inches, width between one and one-half and three inches, and material cross-section dimension between one-quarter and one-half inch.

6. The leash of claim 1 wherein said lead is made of woven nylon.

* * * * *